United States Patent
Wilburn et al.

(10) Patent No.: US 10,314,146 B1
(45) Date of Patent: Jun. 4, 2019

(54) MESH NETWORK OF LIGHTING DEVICES HAVING COMMUNICATION AND CONTROL FUNCTIONS

(71) Applicants: Steven P Wilburn, Newport Beach, CA (US); Steven Carlin, Lake Forrest, CA (US); Raoul Wood, San Dimas, CA (US)

(72) Inventors: Steven P Wilburn, Newport Beach, CA (US); Steven Carlin, Lake Forrest, CA (US); Raoul Wood, San Dimas, CA (US)

(*) Notice: Subject to any disclaimer, the term of this patent is extended or adjusted under 35 U.S.C. 154(b) by 0 days.

(21) Appl. No.: 14/838,576

(22) Filed: Aug. 28, 2015

(51) Int. Cl.
| | |
|---|---|
| H05B 33/08 | (2006.01) |
| H05B 37/02 | (2006.01) |
| F21V 29/74 | (2015.01) |
| F21V 29/508 | (2015.01) |
| H04W 84/18 | (2009.01) |
| F21Y 101/02 | (2006.01) |

(52) U.S. Cl.
CPC ....... *H05B 37/0272* (2013.01); *F21V 29/508* (2015.01); *F21V 29/74* (2015.01); *H04W 84/18* (2013.01); *H05B 33/0845* (2013.01); *H05B 33/0884* (2013.01); *F21Y 2101/02* (2013.01)

(58) Field of Classification Search
None
See application file for complete search history.

(56) References Cited

U.S. PATENT DOCUMENTS

| | | | | |
|---|---|---|---|---|
| 6,700,334 | B2* | 3/2004 | Weng | H05B 37/0272 315/294 |
| 7,211,960 | B2* | 5/2007 | Chen | G08B 5/36 315/157 |
| 8,035,320 | B2* | 10/2011 | Sibert | H05B 37/0245 315/149 |
| 8,364,325 | B2* | 1/2013 | Huizenga | H05B 37/0245 315/152 |
| 9,049,753 | B1* | 6/2015 | Wassel | H05B 37/02 |
| 2012/0026726 | A1* | 2/2012 | Recker | F21K 9/13 362/157 |
| 2016/0330825 | A1* | 11/2016 | Recker | H05B 37/0272 |
| 2017/0231058 | A1* | 8/2017 | Sadwick | H05B 33/0896 |

* cited by examiner

*Primary Examiner* — Crystal L Hammond
(74) *Attorney, Agent, or Firm* — Patent Law & Venture Group; Gene Scott

(57) ABSTRACT

A light emitting diode driver module including a computer device having a data processing device, and a data storage device storing a software instruction set and an electrical circuit including a lighting output stage, an input-output stage, stage a sensor stage, a video stage, a power control and distribution stage, and a transceiver stage. The power control and distribution stage further having a switching stage enabled for switching to open circuit operation when sensing an over-voltage condition, the switching stage having a reset feature and wherein, the instruction set enables signal transfer with and between the input-output signal stage, sensor stage, power control and distribution stage, transceiver stage and an input port.

8 Claims, 3 Drawing Sheets

MESH NETWORK OF LIGHTING DEVICES HAVING COMMUNICATION AND CONTROL FUNCTIONS

FIELD OF THIS DISCLOSURE

This disclosure relates to lighting devices and particularly to wireless sensing and communication systems in common lighting packages arranged in mesh networks.

BACKGROUND

An RF wireless remote-control brightness-adjustable energy-saving lamp is known in U.S. Pat. No. 6,700,334 to L. Weng and provides a brightness-adjustable energy-saving lamp and a RF remote-control module. The brightness-adjustable energy-saving lamp has a RF wireless receiver circuit therein to receive a remote-control signal and transmit it to a CPU. The CPU is used to discriminate the remote-control signal, convert it into a PWM signal, and output the PWM signal to a pulse-to-DC-voltage-level output circuit. The RF remote-control module can learn the internal code of the brightness-adjustable energy-saving lamp and transmit out a remote-control signal to the brightness-adjustable energy-saving lamp through pressing a key.

Apparatus for distributed intelligence in facility lighting control are described in U.S. Pat. No. 8,364,325 to Huizenga et al. A facility lighting system may be organized into multiple control areas, each of which may include one or more component devices. Each lighting control area may be associated with a control apparatus, which controls the operation of the lighting devices of the associated control area based on various types of signal information. Signal information may include information concerning local conditions or environments, as well as information from a centralized control server. Some embodiments further include monitoring the operation and predicting fault states of the lighting control area.

In U.S. Pat. No. 7,211,960 to W. Chen, a burglar-proof wireless light adjusting module is provided wherein a transmission socket of a control module is connected with a lamp and a local power, respectively, whereas a control socket at the other end is connected with a conventional switch. When the switch is turned on or off, a microprocessor transmits a signal of lightening status of a corresponding light bulb to a driving circuit, generates a corresponding control circuit through the driving circuit, to enable the light bulb to generate a continuously changing status of lightening and extinguishing, a status of lightening and extinguishing according to a random time, and a constant brightness, after receiving a status of open circuit and short-circuit, corresponding to various times of status of turning on and off, from the control socket.

The prior art teaches lighting devices with intelligent control. However, the prior art does not teach the level of sensing and control in a mesh type network as described in this disclosure which provides advances in the art.

SUMMARY

A modular wireless sensor mesh network is packaged in one or more lightings devices for mutual sensing and communication. This network may be operated as a local area or wide area system. Redundancy allows the network to suffer individual modular failures without causing the system as a whole to fail or to lose data. Replacing or repairing a failed module is easily accomplished since the modules are mounted in standard receivers known in industry.

The method includes positioning plural lighting and signaling apparatus in mutual proximity for mutual communication and also processing signals using said computer device for controlling signals between said data processing device and an external electrical circuit, wherein said signals can include sensor signals, power control and distribution signals, input port signals, and transceiver signals including signals from: temperature and humidity devices, infrared non-contact temperature scanners, motion dictators, light level sensors, daylighting modules, camera modules, short range mesh networks, carbon monoxide sensors, particle counters, measurement & validation monitors, lighting power usage monitors, and visible light communications.

lamp driver platform modules are capable of interoperation with lighting dimmer, lighting controls embodiments can provide interfacing with building energy management systems, smart grid controls, security systems, fire life safety systems, access control systems and energy monitoring systems and motion detectors. Lamp Platform Driver Modules can interact through the network and be organized in complex control interaction with the environment such as lighting scenes. The Platform Driver Module would be Actors in the scene, making the scene more autonomous. The scene could exhibit some adjusted behaviors based on other variables or sensory input from the platform drive module or other interaction within the nodes in the network. The platform drive module thus has the ability to perceive the scene and interact with the network. Using the lighting module, in the lighting system to create forms of light energy which can interact with a light energy spectrum where the light energy module controls the wavelength of the respective lighting system for the purpose of bidirectional communications with photodiodes and other light sensing and light enabled communication and control devices.

In this document, the terms "a" or "an" are used, as is common in patent documents, to include one or more than one. Furthermore, the term "or" is used to refer to a nonexclusive "or," such that "A or B" includes "A but not B," "B but not A," and "A and B," unless otherwise indicated.

BRIEF DESCRIPTION OF THE DRAWINGS

The presently described device module and its mesh network, in accordance with one or more various embodiments, is described in detail with reference to the following figures. The drawings are provided for purposes of illustration only and depict typical or example embodiments only.

Figure 1:
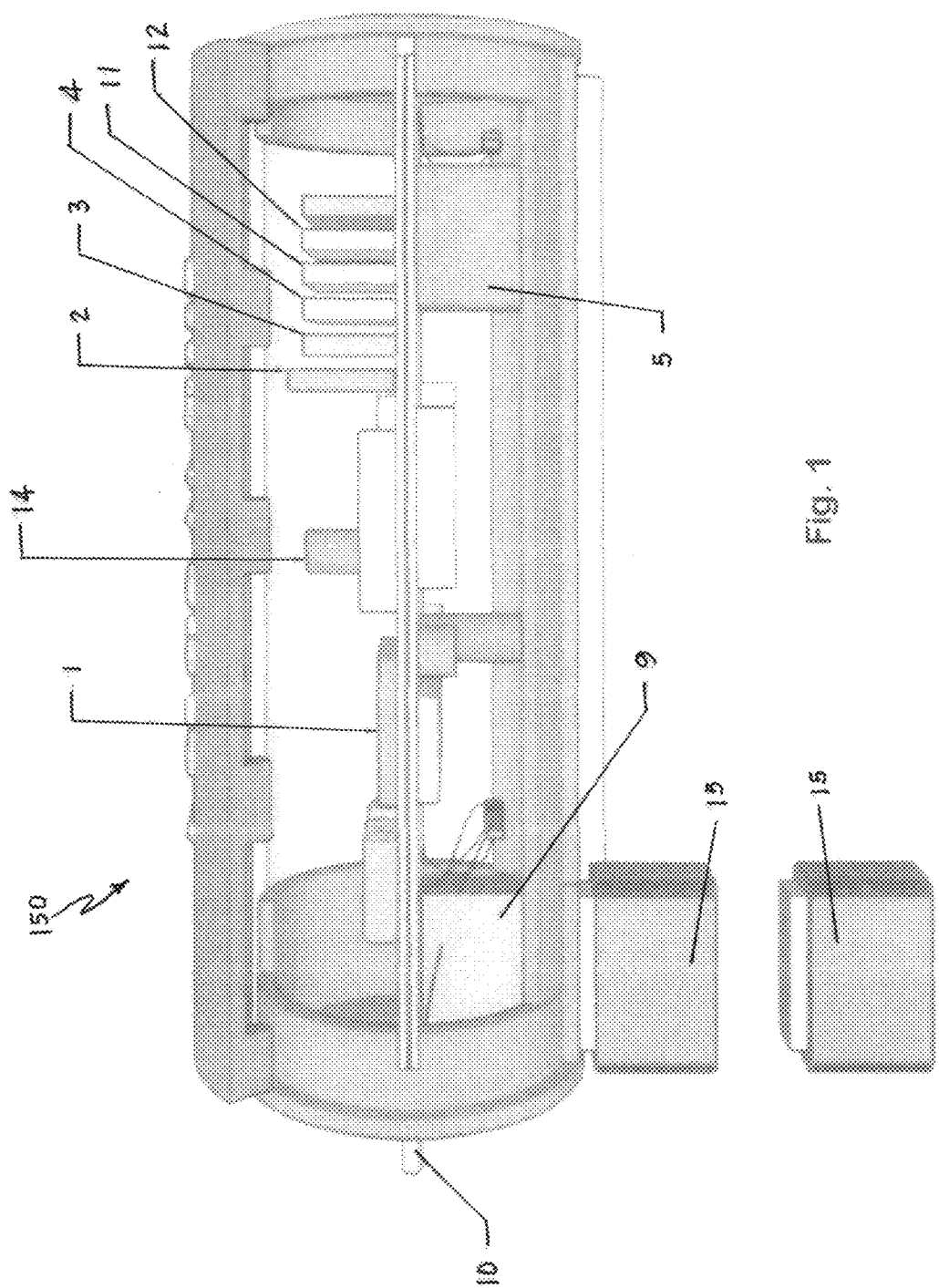
FIG. 1 is a front view of a device described in this disclosure with portions removed for clarity of detail.

The figures are not intended to be exhaustive or to limit the disclosure to the form disclosed and as such it may be practiced with modifications and alterations, and should only be limited by the claims and equivalents thereof.

DETAILED DESCRIPTION

A Lighting system architecture featuring a wireless sensor mesh network 150 is described. Network 150 can be comprised of a plurality of modules or units wherein each unit can include one or more of each of: LED driver module 1, which can be a Texas Instruments Corporation part #FM28M35H52C (a microcomputer); control I.O. board 2;

sensor board 3; solid state memory 4 which can be SRAM units from Maxim Integrated company part#DS1250W; LED lamp driver 5 which can be Diodes Incorporated part#PAM99700AC and has dimming and RBG capability; LED lamp 6; interpret sensors 7; light sensor 8 which can be Osram-Opto Semiconductor Inc. part #SPH5712-2/3; external port 9 which can be ethernet, USB, or thunderbolt for instance; power source 10 which can be a Texas Instruments Corporation TSP61025DRCR; Wi-Fi transceiver 11 which can be Wiznet, Inc. part #WIZFL1630; mesh radio 12 which can be Texas Instruments Corporation part #CC2531F256RHAT; Wi-Fi sensor 13; Monitor 14 for temperature, voltage, current, and power; intelligent source 15; and effector interface A.

An instruction set 1i stored in memory of LED Driver Module 1 enables autonomous operation for establishing and maintaining wireless communication between units and various data storage devices within mesh network 150.

External port 9, Wi-Fi transceiver 11, and mesh radio 12 convert wireless data signals into onboard digital data in LED driver module 1. This data is provided to control I.O. board 2 by interpret sensors 7 which identify the nature and source of the signals. Signals are sent to LED driver module 1 via control I.O. board 2 and processed whereupon responses are transmitted via external port 9, Wi-Fi transceiver 11, and mesh radio 12. Control I.O. board 2 has an 802.15.4 radio that can communicate with other units on its PAN ID.

Figure 2:
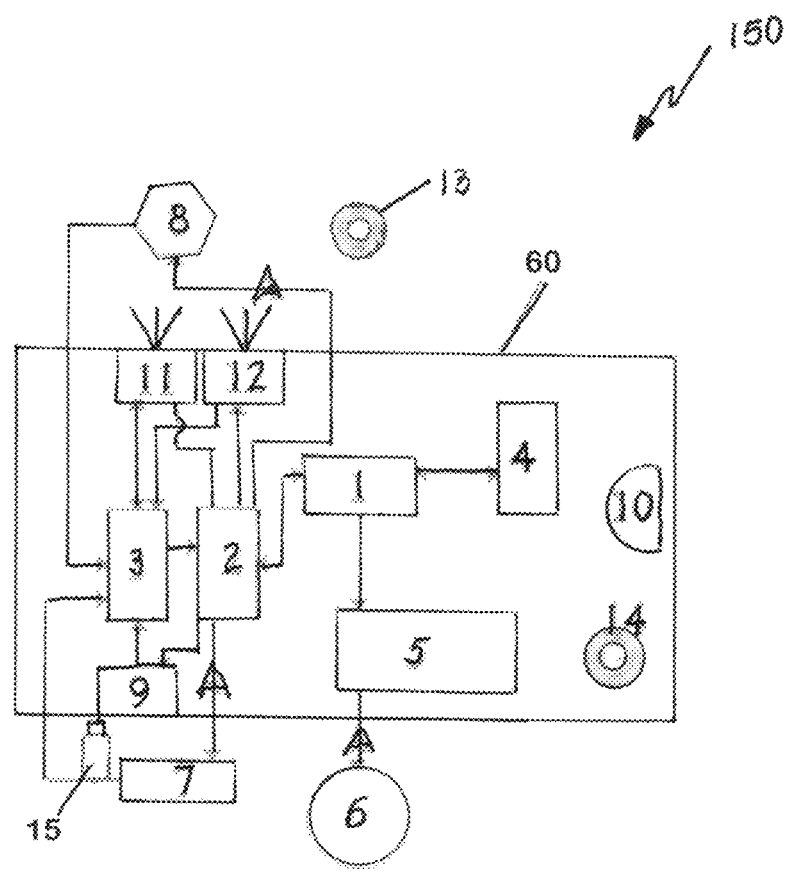
FIG. 2 is a block diagram thereof.
Figure 3:
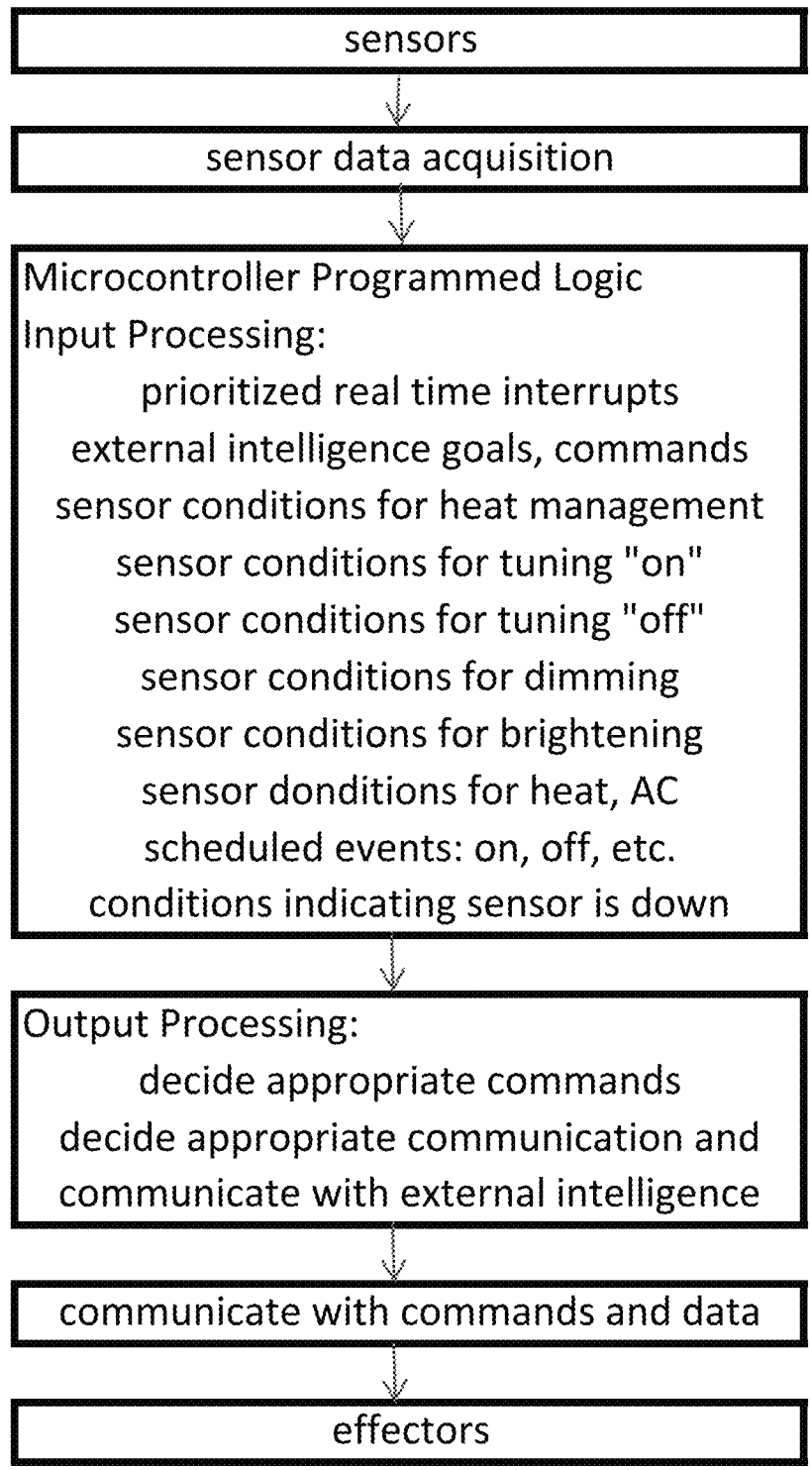
FIG. 3 is a logic diagram of the method thereof.

An embodiment provides in each unit or module of the mesh network 150 a lighting device as shown in FIG. 1 which can include LED driver module 1 which, as stated, can have a microcomputer with a data processing device, and data storage device and said instruction set. LED driver module 1 further can include an electrical circuit 60, see FIG. 2, which can have a lighting output stage, an input-output stage, a sensor stage, a video stage, a distribution stage with power control, and a transceiver stage all of which have been described above. Said distribution stage further can have a switching stage enabled for switching to open circuit operation when sensing an over-voltage condition, wherein said switching stage can have a reset feature wherein, said instruction set can enable signal transfer with and between said input-output stage, sensor stage, distribution stage, transceiver stage and an input port. Said instruction set can include fuzzy logic code capable of self-correction and self-expansion, wherein driver module 1 can have cooling fins and vents for controlling temperature of the unit. Said sensor stage can be enabled for processing signals of temperature, humidity, motion, daylight, gases, and particles. Said video stage can be enabled for processing video signals produced using daylight, artificial light, and infrared energy illumination. Electrical circuit 60 can be enabled for communication with, and processing signals of, lighting dimmers, lighting control systems, building energy management systems, smart grid controls, security systems, fire life safety systems, access control systems, motion detectors, facial recognition cameras, security cameras, and energy monitoring systems. As said instruction set 1i can include fuzzy logic code and/or other forms of artificial intelligence capable of self-correction and self-expansion. Said reset feature can be operated by a manual button or may be operated by a stage of electrical circuit 60 that can be enabled for actuating a reset action when an input voltage is zero. Electrical circuit 60 can be enabled for signal exchange with external devices operating in the light spectrum over a range between infrared and ultraviolet. Said distribution stage can be enabled for detecting a power usage. Said transceiver stage can be enabled for sending and receiving signals by radio, microwave, light, and Bluetooth.

An embodiment provides mesh network 150 for signal processing and lighting apparatus units as described previously, wherein units can be in mutual wireless communication, wherein each unit can have a self-cooling driver housing holding communication and sensing elements including said computer device with said data processing device, said data storage device, said instruction set 1i, and can include electrical circuit 60. Therefore, each unit is able to communicate wirelessly with any and all other units.

An embodiment provides a method of operating network 150 including operating each unit's lighting and signaling apparatus as previously described and including the step of processing signals using said computer device and controlling signals between said data processing device and said electrical circuit 60 wherein said signals can be wirelessly transmitted and received, and wherein said signals can include input-output signals, sensor signals, power control and distribution signals, input port signals.

In the foregoing description, embodiments are described as a plurality of individual parts, and this is solely for the sake of illustration. Accordingly, it is contemplated that some additional parts may be added, some parts may be changed or omitted, and the order of the parts may be re-arranged, without leaving the sense and understanding of the apparatus as claimed.

What is claimed is:

1. A mesh network of lighting devices having communication and control functions, the mesh network comprising:
   a plurality of units, wherein each unit includes an electrical circuit having: an LED driver module, a control I.O. board, a sensor board, a solid-state memory, a lamp driver with dimming and RBG capability, an LED lamp, interpret sensors, a light source, an external port, a power source, a Wi-Fi transceiver, a mesh radio, a Wi-Fi sensor, a monitor enabled for displaying temperature, voltage, current and power levels, and a computer device having a data processing device, and a data storage device storing a software instruction set;
   a switching stage with a reset feature is enabled for switching to open circuit operation when said sensor board senses an over-voltage condition;
   wherein, signal transfer between said units is enabled with and between an input-output stage of said electrical circuit via said Wi-Fi transceiver.

2. The network of claim 1 wherein the mesh network further comprises a driver housing having cooling fins and vents.

3. The network of claim 1 wherein the sensor board is enabled for processing signals of temperature, humidity, motion, daylight, gases, and particles.

4. The network of claim 1 wherein the electrical circuit is enabled for processing video signals produced using daylight, artificial light, and infrared energy illumination.

5. The network of claim 1 wherein the electrical circuit is enabled for communication with, and processing signals of, lighting dimmers, lighting control systems, building energy management systems, smart grid controls, security systems, fire life safety systems, access control systems, motion detectors, facial recognition cameras, security cameras, and energy monitoring systems.

6. The network of claim 1 wherein the reset feature is operated by a manual button.

7. The network of claim 1 wherein the electrical circuit is enabled for signal exchange with external devices operating in the light spectrum between infrared and ultraviolet.

8. The network of claim 1 wherein the Wi-Fi transceiver stage is enabled for sending and receiving signals propagated by radio, microwave, light, and Bluetooth.

* * * * *